United States Patent
Franzen et al.

(10) Patent No.: US 8,506,240 B2
(45) Date of Patent: Aug. 13, 2013

(54) FREE-SURFACE LIQUID TRANSFER DEVICE FOR ROTATING MACHINERY

(75) Inventors: Mark F. Franzen, Brodhead, WI (US); Robert Scott Downing, Rockford, IL (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 5 days.

(21) Appl. No.: 13/279,231

(22) Filed: Oct. 21, 2011

(65) Prior Publication Data

US 2013/0101394 A1    Apr. 25, 2013

(51) Int. Cl.
    *F01D 11/00*    (2006.01)
(52) U.S. Cl.
    USPC ........................................... 415/112
(58) Field of Classification Search
    USPC .............. 415/116, 211.2, 178, 180, 112, 111; 60/339, 337; 184/11.1, 11.2, 13.1
    See application file for complete search history.

(56) References Cited

U.S. PATENT DOCUMENTS

| | | | |
|---|---|---|---|
| 2,709,567 A * | 5/1955 | Wood | 415/115 |
| 7,342,332 B2 | 3/2008 | McAuliffe et al. | |
| 7,493,756 B2 * | 2/2009 | Mizuno et al. | 60/339 |
| 7,575,421 B2 | 8/2009 | McAuliffe et al. | |
| 7,644,792 B2 | 1/2010 | Telakowski | |
| 7,732,953 B2 | 6/2010 | Telakowski | |
| 7,736,129 B2 | 6/2010 | Matsuo | |
| 2002/0101121 A1 | 8/2002 | Semba et al. | |
| 2009/0037035 A1 * | 2/2009 | Hershey et al. | 701/3 |
| 2010/0148601 A1 | 6/2010 | Lee et al. | |
| 2010/0289386 A1 * | 11/2010 | Gerstler et al. | 310/60 A |
| 2011/0092371 A1 | 4/2011 | Lee et al. | |
| 2011/0156509 A1 | 6/2011 | Minemura et al. | |

\* cited by examiner

*Primary Examiner* — Edward Look
*Assistant Examiner* — Aaron R Eastman
(74) *Attorney, Agent, or Firm* — Cantor Colburn LLP

(57) ABSTRACT

A free-surface liquid transfer apparatus for rotating machinery includes a rotating member. The rotating member includes a main shaft defining a hollow inner cavity, an outer cylindrical wall defining a hollow annular cavity in fluid communication with the hollow inner cavity through a plurality of orifices formed on the main shaft, and a slinger formation in fluid communication with the hollow annular cavity through a plurality of radial slots formed through the slinger formation. A central axis of the main shaft, a central axis of the hollow annular cavity, and a central axis of the slinger formation are collinear, and the slinger formation is configured to transmit working fluid received through the plurality of radial slots outward as a continuous film having both tangential and radial velocity components.

19 Claims, 4 Drawing Sheets

FREE-SURFACE LIQUID TRANSFER DEVICE FOR ROTATING MACHINERY

GOVERNMENT LICENSE RIGHTS

This invention was made with Government support under Contract No. FA8650-06-D-2621-0002 awarded by the Department of the Air Force. The Government has certain rights in this invention.

BACKGROUND OF THE INVENTION

The present invention is generally related to liquid cooling of rotating machinery, and more particularly, exemplary embodiments of the present invention are directed to free-surface liquid transfer between rotating and stationary members of rotating machinery.

Liquid that circulates between stationary and rotating members of rotating machinery requires liquid transfer devices for liquid delivery to, and subsequent recovery from, the rotating member. A transfer tube is typically employed at the rotating member shaft centerline for liquid delivery. However, many machine designs preclude the use of another transfer tube for liquid recovery. Additionally, liquid within the rotating member shaft can exert relatively high static pressure induced by centrifugal force.

BRIEF DESCRIPTION OF THE INVENTION

According to an exemplary embodiment of the present invention, a free-surface liquid transfer apparatus for rotating machinery includes a rotating member. The rotating member includes a main shaft defining a hollow inner cavity, an outer cylindrical wall defining a hollow annular cavity in fluid communication with the hollow inner cavity through a plurality of orifices formed on the main shaft, and a slinger formation in fluid communication with the hollow annular cavity through a plurality of radial slots formed through the slinger formation. A central axis of the main shaft, a central axis of the hollow annular cavity, and a central axis of the slinger formation are collinear, and the slinger formation is configured to transmit working fluid received through the plurality of radial slots outward as a continuous film having both tangential and radial velocity components.

According to another exemplary embodiment of the present invention, a cooling system for rotating machinery includes a reservoir configured to store a working fluid, a pumping system configured to remove working fluid from the reservoir, and a rotating member. According to the exemplary embodiment, the rotating member includes a main shaft defining a hollow inner cavity configured to receive working fluid from the pumping system, an outer cylindrical wall defining a hollow annular cavity in fluid communication with the hollow inner cavity through a plurality of orifices formed on the main shaft, and a slinger formation in fluid communication with the hollow annular cavity through a plurality of radial slots formed through the slinger formation. A central axis of the main shaft, a central axis of the hollow annular cavity, and a central axis of the slinger formation are collinear, and the slinger formation is configured to transmit working fluid received through the plurality of radial slots outward as a continuous film having both tangential and radial velocity components.

According to yet another exemplary embodiment of the present invention, a free-surface liquid transfer apparatus for rotating machinery includes a stationary member. The stationary member includes an outer cylindrical wall, a perforated inner cylindrical wall concentric to the outer cylindrical wall defining a hollow annular cavity configured to receive transferred working fluid, and a plurality of vanes arranged proximate the perforated inner cylindrical wall. The plurality of vanes are configured to direct fluid received from a rotating member onto the perforated inner cylindrical wall

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
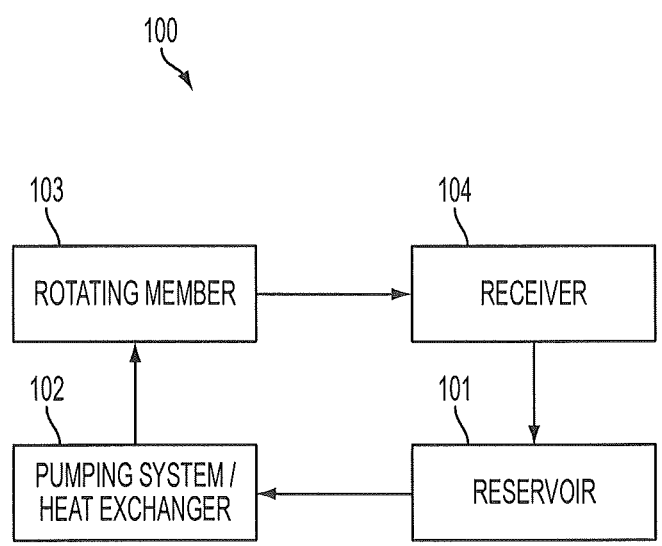
FIG. 1 is a diagram of a liquid cooling system for rotating machinery, according to an exemplary embodiment.

Exemplary embodiments of the present invention provide a free-surface, circumferentially continuous film of liquid transferring from a rotating member to a stationary member within a rotating machine. Liquid is transferred from an interior of the rotating member to the inclined surface of the slinger portion through slots of sufficient radial depth to function as a type of weir. The radial position of these slots effectively sets the inside diameter of the fluid held in the rotor by the centrifugal forces. The free surface of each weir produces an ambient pressure boundary condition within the interior of the rotating member. The shape and alignment of the rotating surface (slinger) and the stationary surfaces (vanes) are selected so that liquid film is transferred without splashing or backflow of liquid mist across the gap between rotating and stationary members. The circumferentially uniform surface of the slinger slopes such that the liquid film thins as it moves axially and radially outward on the surface of the slinger.

The stationary member, in turn, incorporates a receiver which captures the film of liquid issued from the slinger portion. The circumferentially continuous film of liquid is captured between adjoining spiraled solid vanes and a cylindrical surface with a plurality of small orifices in the radial direction. The progressively constricting zone between solid vanes and the cylindrical surface with orifices, herein called a "perforated inner cylindrical wall", forms a flow space wherein the rapidly moving fluid film slows, thickens and builds pressure. Pressure differential across the perforated inner cylindrical wall transfers fluid to the collection annulus. The circumferentially continuous film of liquid that forms on the porous wall creates a barrier to prevent the backwash of liquid or mist into the free space between the rotating member and stationary member of the machine. Depending on machine configuration, a suitable thin-wall sleeve or other barrier may further be included to separate drained liquid from the free space between rotating and stationary members.

As disclosed herein, technical effects and benefits of exemplary embodiments of the present invention include capability for free-surface conveyance of liquid from a rotating member to a stationary member with minimal dispersal of liquid or mist to the free space between members. Exemplary embodiments eliminate the need to convey the fluid through internal passages and transfer tubes where such may be difficult to implement with regard to both the physical placement of passageways and the hydraulic head needed to generate flow-rate. Further, exemplary embodiments are self-pumping in that sufficient hydraulic head is provided by the rotating member. Moreover, a particular benefit to aerospace electric machinery is the capability to recover oil from enclosed, liquid-immersion-cooled rotor windings of an electric machine without fouling the air gap between rotor and stator with heavy oil mist. Elimination of air gap fouling can serve to reduce rotational drag resulting in higher machine efficiency, lower heat load, and lower equipment temperature in one embodiment.

Turning now to FIG. 1, a diagram of a liquid cooling system for rotating machinery is illustrated, according to an exemplary embodiment. The system 100 includes a reservoir 101 configured to retain a measure of a working fluid (e.g., oil) suitable for cooling of a rotating machine. The system 100 further includes a pumping system and heat exchanger 102 in fluid communication with the reservoir 101. The pumping system and heat exchanger 102 may pump working fluid from the reservoir 101 to a rotating member 103 of a rotating machine. As described above, the rotating member 103 may include a rotor and slinger portion arranged thereon, which are described more fully with reference to FIG. 2.

As further illustrated, the system 100 also includes a receiver 104 configured to receive a working fluid from the rotating member 103 and transfer the working fluid to the reservoir 101. In this manner, fluid is transferred throughout the system 100 such that heat may be transferred away from the rotating member through the use of the reservoir 101 and pumping system 102.

Figure 2:
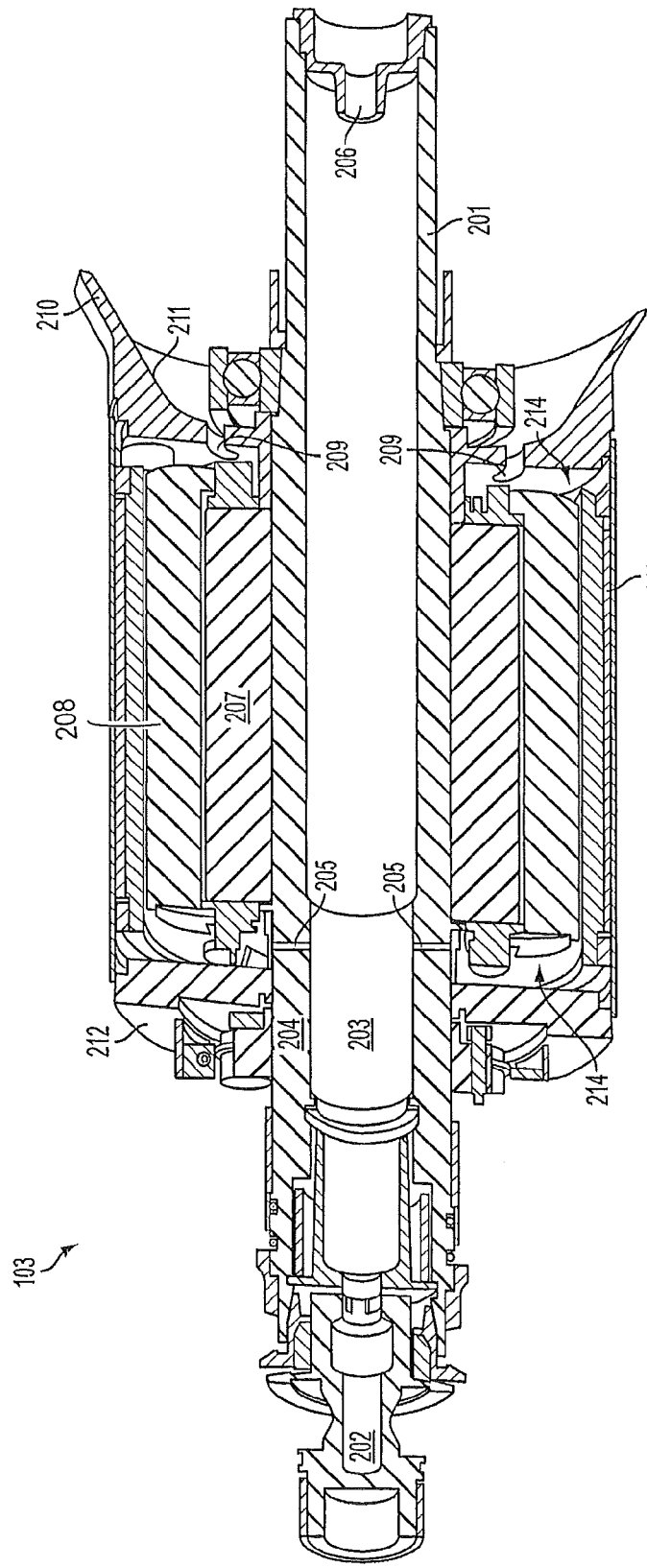
FIG. 2 is an isometric view of a rotating member of a rotating machine, according to an exemplary embodiment.

Turning now to FIG. 2, an isometric view of a rotating member 103 of a rotating machine is illustrated, according to an exemplary embodiment. The rotating member 103 includes main shaft 201 arranged collinear to a central axis of the rotating member 103. The main shaft 201 includes a first end 206 configured to receive a working fluid (e.g., oil) from a pumping system at least somewhat similar to pumping system 102, and a closed second end 202. Second end 202 typically provides mechanical power transmission between rotating member and external machinery. The main shaft 201 further includes inner cylindrical wall 204 defining an inner cavity 203. A central axis of the inner cylindrical wall 204 is arranged collinear to the central axis of the rotating member 103. The inner cavity 203 may be a generally hollow cavity configured to convey working fluid throughout the rotating member 103 from the first end 206 to the second end 202.

As further illustrated, the rotating member 103 further includes outer cylindrical wall 213, first annular wall 212 spanning between the outer cylindrical wall 213 and inner cylindrical wall 204, and a slinger portion 210 also spanning between the outer cylindrical wall 213 and inner cylindrical wall 204. As shown, the first annular wall 212, slinger portion 210, inner cylindrical wall 204, and outer cylindrical wall 213 define a hollow annular cavity 214 disposed to house componentry 207 and 208 of the rotating member 103. Componentry 207 and/or 208 are sufficiently porous to provide continuity to the hollow annular cavity between first annular wall 212 and slinger portion 210. Furthermore, a central axis of the hollow annular cavity 214 is arranged collinear to a central axis of the rotating member 103.

As further illustrated, the rotating member 103 includes a plurality of orifices 205 arranged on the inner cylindrical wall 204. The plurality of orifices 205 allow working fluid communication between the inner cavity 203 and the hollow annular cavity 214. For example, as the rotating member 103 is configured to rotate, centrifugal forces may push working fluid from the inner cavity 203 through the orifices 205 into the hollow annular cavity 214.

As further illustrated, the rotating member 103 also includes a plurality of radial slots 209 formed on the slinger portion 210. Therefore, as working fluid fills the hollow annular cavity 214 during rotation of the rotating member 103, the working fluid flows past componentry 207 and 208 cooling said componentry and exiting the hollow annular cavity 214 through the plurality of slots 209. According to one exemplary embodiment, the plurality of radial slots 209 are positioned radially so that the liquid depth in the rotor is sufficient to immerse and cool heat generating elements. Each slot of the plurality of radial slots 209 is sufficient radial depth to form a weir and not be filled with liquid. Furthermore, the free surface at each weir produces an ambient pressure boundary condition within the rotating member such that working fluid flow is controlled to within a desired rate to provide ample cooling while not over pressurizing the hollow annular cavity 214.

As further illustrated, the slinger portion 210 includes a main surface 211 in communication with the plurality of radial slots 209. Thus, working fluid is transferred from hollow annular cavity 214 to the main surface 211 of the slinger portion 210 through the plurality of radial slots 209. Furthermore, the main surface 211 is inclined in monotonically increasing radial direction somewhat similar to a bell or bell-like shape. Therefore, as the rotating member 103 rotates and fluid is transferred to the main surface 211, a continuous film of working fluid is produced at an outer edge of the main surface 211 with both tangential and radial velocity components. As this continuous film flows outwards, it may be transferred to a stationary member or receiver of a rotating machine. Such is illustrated and described with reference to FIGS. 3-4.

Figure 3:
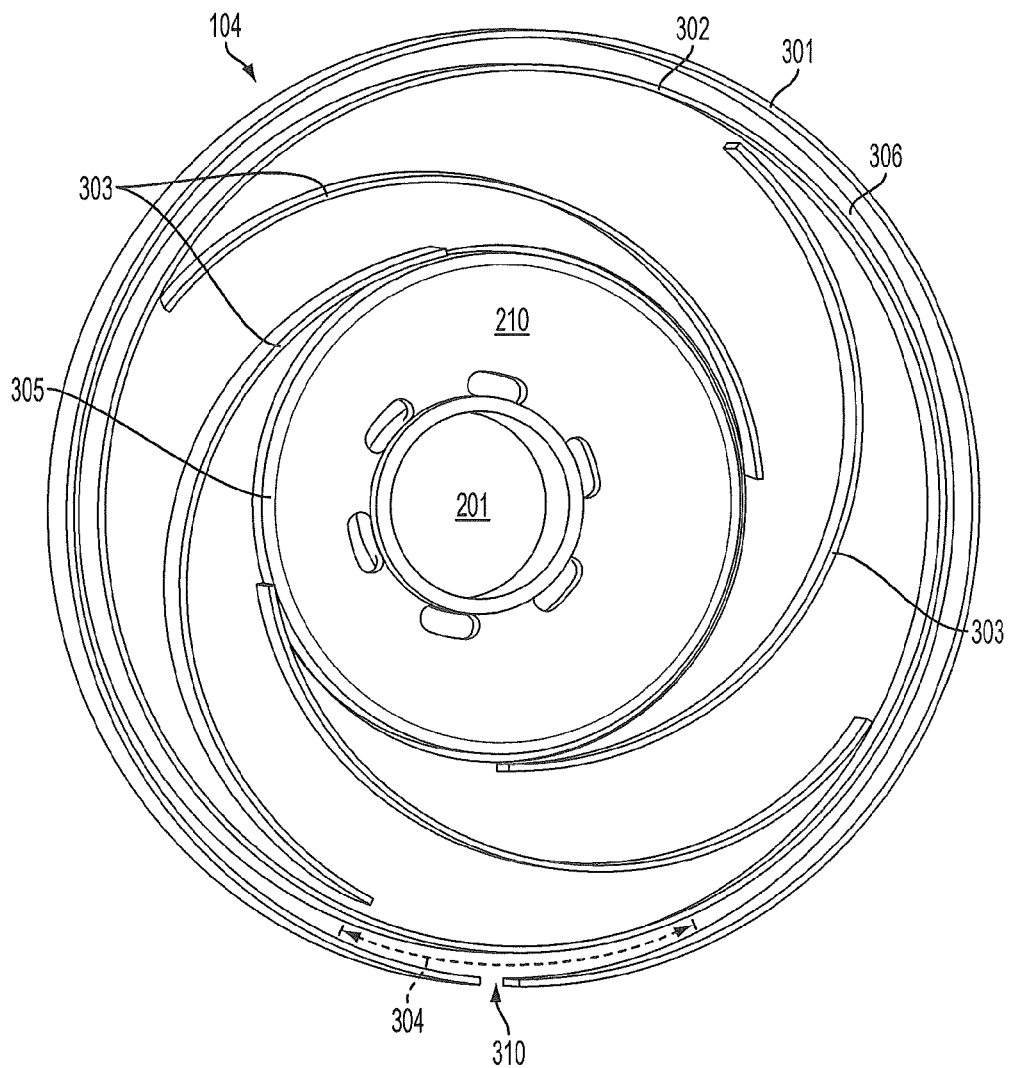
FIG. 3 is a cross sectional view of a static member and rotating member arranged to transfer fluid, according to an exemplary embodiment.

Turning now to FIG. 3, a cross sectional view of the static member/receiver 104 of a rotating machine is illustrated, according to an exemplary embodiment. As illustrated, the receiver 104 is arranged as an annular formation about a central axis of the slinger portion 210 and main shaft 201 of the rotating member 103. The receiver 104 includes an outer cylindrical wall 301 and a perforated inner cylindrical wall 302 defining a hollow annular cavity 306. The receiver 104 further includes a plurality of curved vanes 303 arranged between the perforated inner wall 302 and an air gap 305 which surrounds the slinger portion 210. The plurality of vanes 303 may be curved, solid ridges configured to direct fluid slung from the slinger portion 210 across the air gap 305 onto the perforated inner wall 302. As the fluid film lands on the curved vane, it slows in velocity and grows in thickness upon the vane. As the fluid film thickness bridges the converging gap between adjacent vanes, a pressure nozzle 304 is formed between adjacent vanes 303 which forces fluid through the perforated inner wall 302 into the hollow annular cavity 306, which then drains through opening 310 to a suitable sump or orifice.

Figure 4:
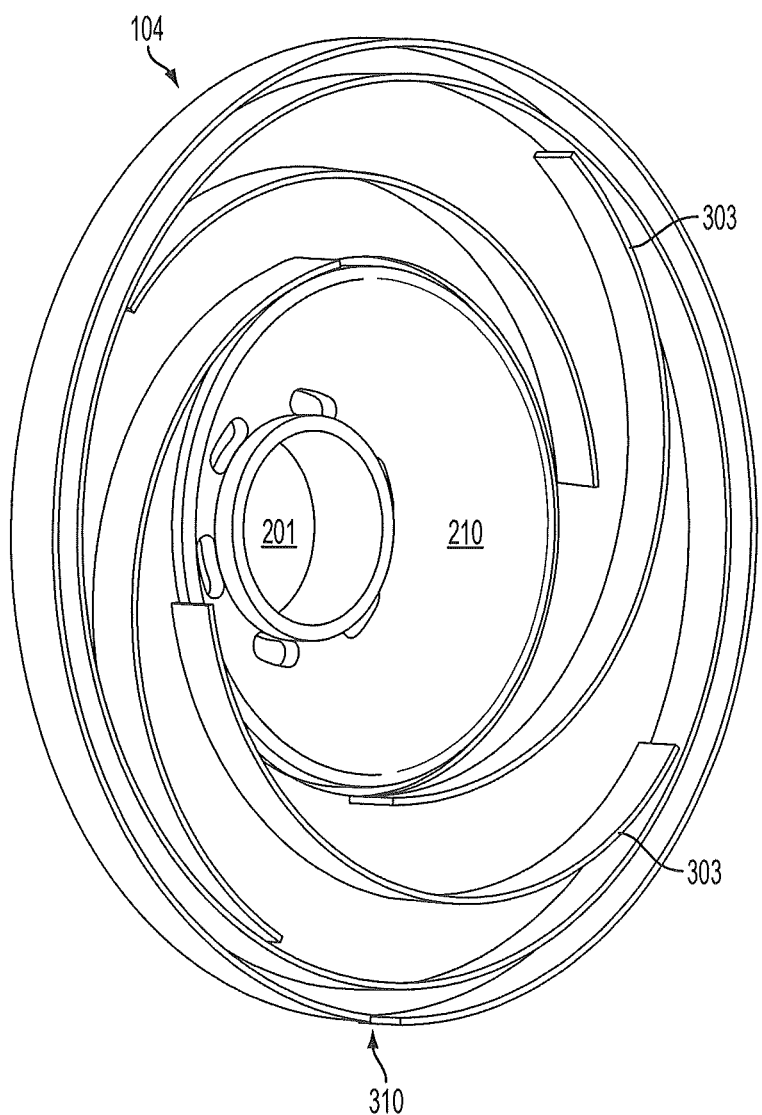
FIG. 4 is a perspective view of a static member and rotating member arranged to transfer fluid, according to an exemplary embodiment.

A perspective view of the relationship between the receiver 104 and the slinger portion 210 is illustrated in FIG. 4. As shown, fluid leaving the slinger portion 210 is directed by the plurality of vanes 303 such that the fluid may drain through opening 310 to a sump and return to a reservoir, for example, reservoir 101.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A free-surface liquid transfer apparatus for rotating machinery, comprising:
a rotating member, wherein the rotating member comprises:
a main shaft defining a hollow inner cavity;
an outer cylindrical wall defining a hollow annular cavity in fluid communication with the hollow inner cavity through a plurality of orifices formed on the main shaft; and
a slinger formation in fluid communication with the hollow annular cavity through a plurality of radial slots formed through the slinger formation;
wherein a central axis of the main shaft, a central axis of the hollow annular cavity, and a central axis of the slinger formation are collinear, and
wherein the slinger formation is configured to transmit working fluid received through the plurality of radial slots outward as a continuous film having both tangential and radial velocity components.

2. The apparatus of claim 1, wherein the rotating member further comprises a plurality of rotating machine componentry arranged inside the hollow annular cavity.

3. The apparatus of claim 1, wherein the plurality of radial slots form a weir and wherein a radial depth of the plurality of radial slots is configured to provide a free-surface for working fluid flow over the weir.

4. The apparatus of claim 1, wherein the slinger formation comprises:
a main surface inclined monotonically in a radial direction.

5. The apparatus of claim 4, wherein the inclined main surface is circumferentially uniform about the central axis of the rotating member.

6. The apparatus of claim 4, wherein the inclined main surface is inclined in monotonically increasing radial direction.

7. The apparatus of claim 1, further comprising:
a stationary receiver arranged about the central axis of the rotating member and around the slinger formation, wherein the stationary receiver is configured to receive the continuous film of working fluid.

8. The apparatus of claim 7, wherein the stationary receiver comprises:
an outer cylindrical wall; and
a perforated inner cylindrical wall concentric to the outer cylindrical wall defining a hollow annular cavity configured to receive transferred working fluid.

9. The apparatus of claim 8, wherein the stationary receiver further comprises:
a plurality of vanes arranged between the perforated inner cylindrical wall and the slinger portion of the rotating member, wherein the plurality of vanes are configured to direct fluid received from the slinger portion onto the perforated inner cylindrical wall.

10. The apparatus of claim 8, wherein the stationary receiver further comprises an orifice configured to drain working fluid from the hollow annular cavity.

11. A cooling system for rotating machinery, comprising:
a reservoir configured to store a working fluid;
a pumping system configured to remove working fluid from the reservoir; and
a rotating member, wherein the rotating member comprises:
a main shaft defining a hollow inner cavity configured to receive working fluid from the pumping system;
an outer cylindrical wall defining a hollow annular cavity in fluid communication with the hollow inner cavity through a plurality of orifices formed on the main shaft; and
a slinger formation in fluid communication with the hollow annular cavity through a plurality of radial slots formed through the slinger formation;
wherein a central axis of the main shaft, a central axis of the hollow annular cavity, and a central axis of the slinger formation are collinear, and
wherein the slinger formation is configured to transmit working fluid received through the plurality of radial slots outward as a continuous film having both tangential and radial velocity components.

12. The system of claim 11, wherein the rotating member further comprises a plurality of rotating machine componentry arranged inside the hollow annular cavity.

13. The system of claim 11, wherein the plurality of radial slots form a weir and wherein the plurality of radial slots is configured to provide a free-surface for working fluid flow over the weir.

14. The system of claim 11, wherein the slinger formation comprises:
a main surface inclined monotonically in a radial direction.

15. The system of claim 14, wherein the inclined main surface is circumferentially uniform about the central axis of the rotating member.

16. The apparatus of claim 14, wherein the inclined main surface is inclined monotonically in a radial direction.

17. The system of claim 11, further comprising:
a stationary receiver arranged about the central axis of the rotating member and around the slinger formation, wherein the stationary receiver is configured to receive the continuous film of working fluid.

18. The system of claim 17, wherein the stationary receiver comprises:
an outer cylindrical wall; and
a perforated inner cylindrical wall concentric to the outer cylindrical wall defining a hollow annular cavity configured to receive transferred working fluid.

19. The system of claim 18, wherein the stationary receiver further comprises:
a plurality of vanes arranged between the perforated inner cylindrical wall the slinger portion, wherein the plurality of vanes are configured to direct fluid received from the slinger portion onto the perforated inner cylindrical wall.

* * * * *